Feb. 23, 1960 M. J. PURETIC 2,925,680
DRAW NET AND METHOD OF USING SAME
Filed Sept. 4, 1956 3 Sheets-Sheet 1
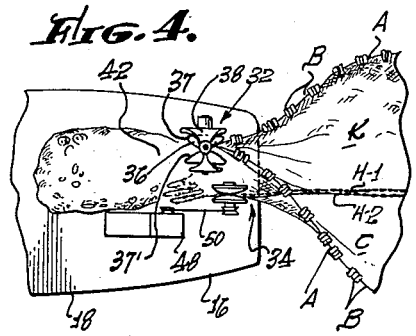
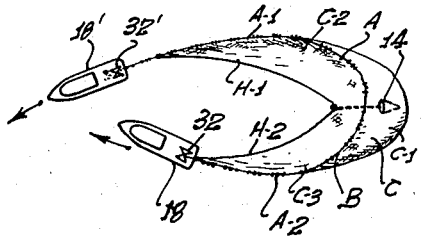
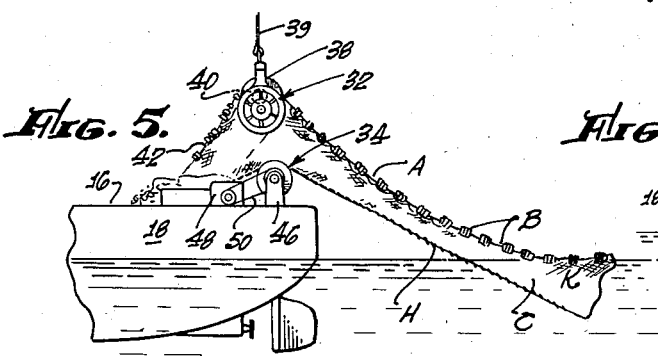
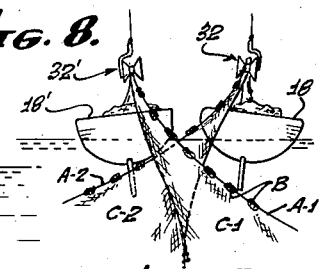
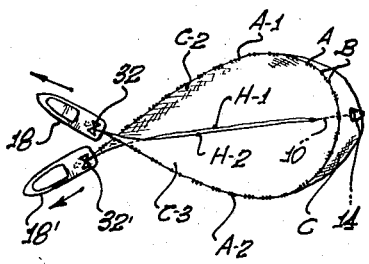
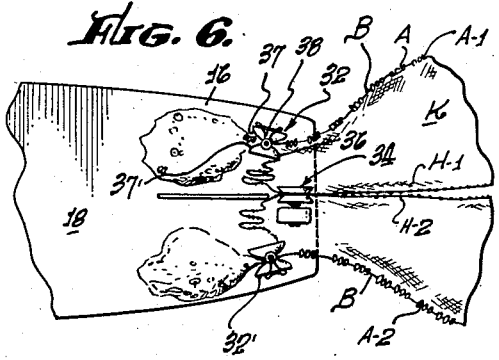
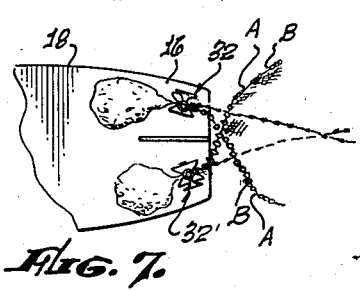
Mario J. Puretic,
Inventor.
By
William C. Babcock
Attorney.

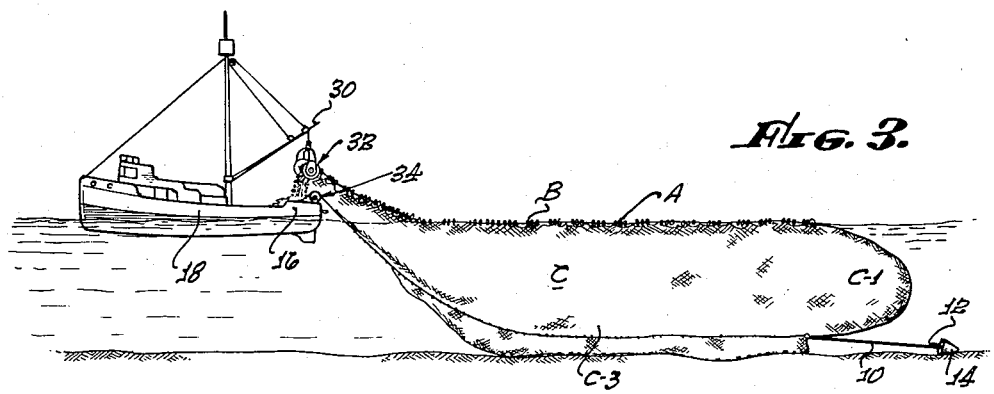
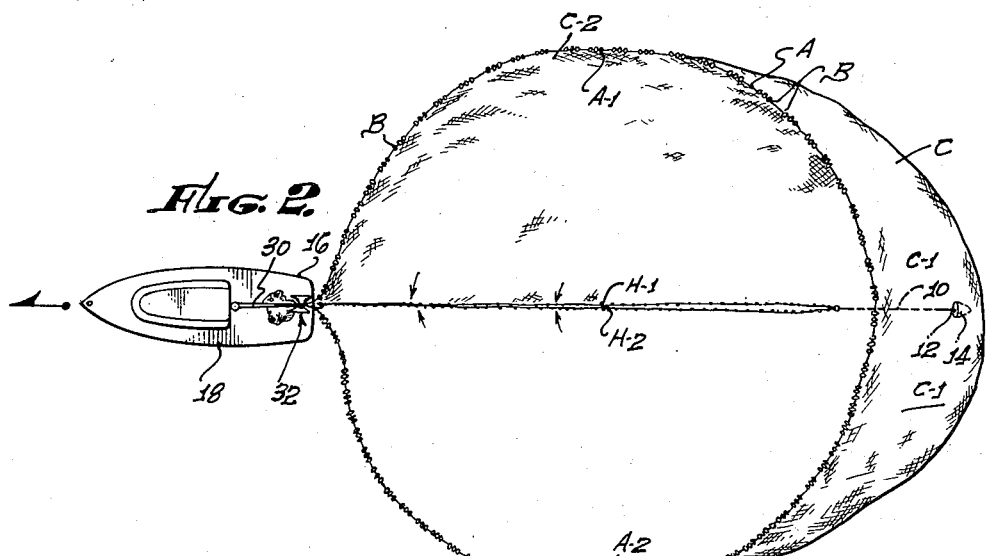
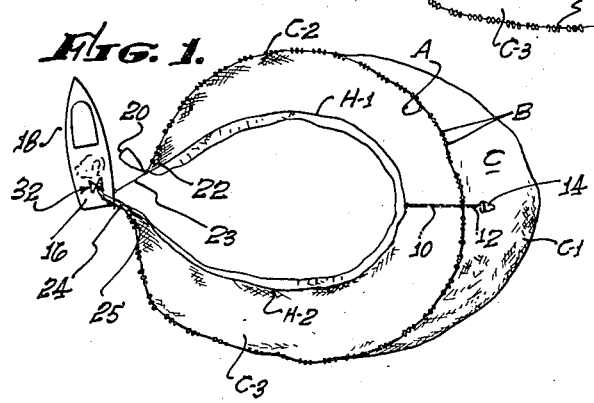
Mario J. Puretic
Inventor

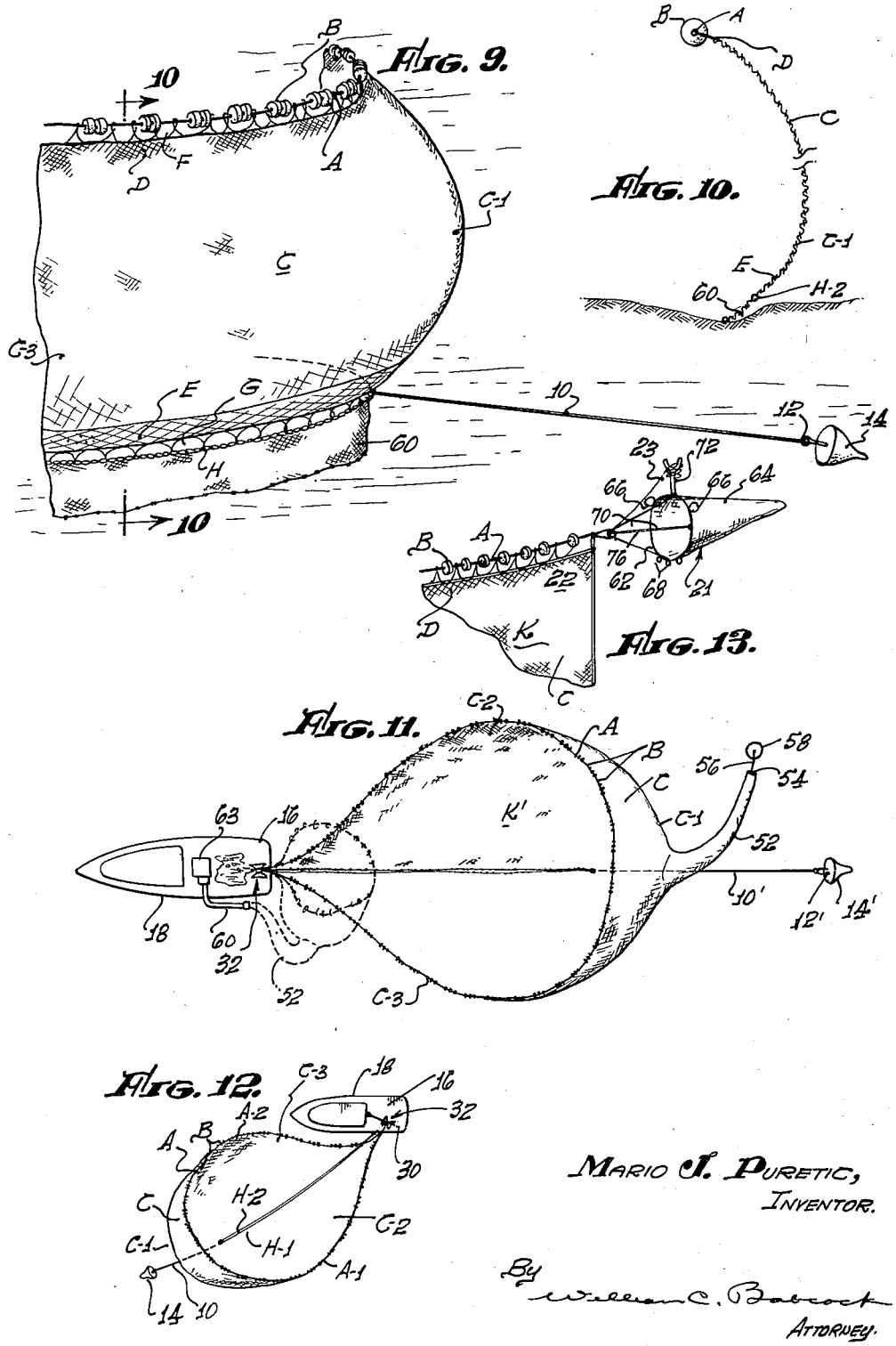

United States Patent Office 2,925,680
Patented Feb. 23, 1960

2,925,680

DRAW NET AND METHOD OF USING SAME

Mario J. Puretic, Torrance, Calif.

Application September 4, 1956, Serial No. 607,683

10 Claims. (Cl. 43—4.5)

The present invention relates generally to commercial fishing, and more particularly to a new and novel draw net and the method of using same.

In the past, two types of nets have been employed by commercial fishermen when fishing for fish that school, the purse seine and the much smaller lampara net that is primarily used for catching bait. The purse seine is a long wall of webbing that hangs downwardly in the water from a cork line, and when it is in the set position, it roughly forms a circle. A lead line is affixed to the lower edge of the purse seine webbing, from which line longitudinally spaced rings depend through which a purse line extends. By drawing the purse line into the boat from which the purse seine has been set, the lead line is bunched or puckered to close the bottom of the net and impound the fish therein before the loaded net is drawn aboard the boat.

The lampara is also an elongate net having an intermediate bag portion that is relatively wide from which two narrower wing portions extend. The lampara net is also set in the water in a generally circular configuration and is supported by a cork line. A lead line is affixed to the lower edge of the lampara webbing. After this net is set, the lead line is pulled toward the boat in advance of the cork line to partially close the bottom of the net as it assumes a scoop-like shape. There is no pursing of the lampara bait net other than that afforded by closing of the lead line as the net is pulled.

Although both types of net described above have been used commercially for many years, each of these nets have serious operational disadvantages. The disadvantages of the purse seine net reside in the fact that it requires an excessive amount of time to set and retrieve it, and this net must be carefully stacked aboardship as it is retrieved to avoid snarling and fouling of the various parts thereof when the set is made. The disadvantage of the lampara net is that it is but partially closed as it is hauled into the boat and fish escape therefrom. Also this type of net is comparatively small.

The primary purpose in devising the present invention is to provide a net that can be easily and quickly set and retrieved without danger of snarling and fouling of the components thereof, and one that is completely closed at the time it is hauled aboardship whereby there is no loss of the catch entrapped therein.

A major object of the invention is to provide a commercial fishing net that is extremely simple structurally and is particularly well adapted for use with my power block as disclosed and claimed in United States Letters Patent No. 2,733,530, entitled Net Handling Apparatus.

A further object of the invention is to supply a net by means of which the catch may be greatly increased, yet which requires the use of approximately one-third the crew members formerly needed when employing either a purse seine or lampara type net as relatively little manual handling is required, with the resultant saving of approximately sixty percent in the cost of catching bait or fertilizer fish.

These and other objects and advantages of the invention will become apparent from the following description of a preferred form thereof, and from the drawings illustrating same, in which:

Figure 1 is a plan view showing my net in the set position;

Figure 2 is a plan view of the net shown in the closed position just before it is hauled aboardship;

Figure 3 is a side elevational view of the net showing the manner in which the weight associated therewith maintains the lead lines in closed position as the net is drawn aboardship;

Figure 4 is a plan view of the stern portion of a fishing vessel showing the manner in which a power block mounted thereon handles the cork line of my net as well as the lead line thereof after first frictional engagement of the lead line with a power pulley;

Figure 5 is a side elevational view of the power block, power pulley and net as shown in Figure 4;

Figure 6 is a plan view of the stern portion of a vessel showing the manner in which two elevated power blocks and an intermediately disposed power pulley cooperatively retrieve my net from the water;

Figure 7 is a plan view of the stern portion of a fishing boat showing the manner in which two elevated power blocks can be employed to retrieve my net from the water;

Figure 8 is a diagrammatic and elevational view of two boats showing the manner in which the end portions of the nets cross over in the closing of the net;

Figure 8a is a diagrammatic plan view showing the manner in which two moving boats may be employed to set my net;

Figure 8b is a diagrammatic plan view showing the relative positions of the boats illustrated in Figure 8a, just before the net is drawn from the water;

Figure 9 is a perspective view of the outermost portion of my net when set, showing a secondary bottom contour net that depends downwardly from the bottom line;

Figure 10 is a vertical cross-sectional view of the device taken on line 10—10 of Figure 9;

Figure 11 is a plan view of a first alternate form of my net which embodies a funnel-shaped portion that can be positioned as shown in phantom line to facilitate unloading of the catch from the net;

Figure 12 is a diagrammatic plan view of my net showing the preferred position of the vessel as the net is retrieved from the sea; and Figure 13 is a perspective view of a sea anchor that can be used with my net.

Referring to the drawings for the general arrangement of my draw net invention, it will be seen that it includes a cork line A, which as its name implies, has a number of corks, floats, or other buoyant bodies B affixed thereto at spaced intervals. Cork line A supports therefrom an elongate wall or panel of webbing, referred to generally by the letter C, as can best be seen in Figures 1, 2, 3 and 9. From experience it has been found desirable to form the webbing C with a rearwardly disposed portion known as the bunt C-1 that is relatively wide, from which bunt narrower wings C-2 and C-3 extend on each side thereof. Webbing C has selvaged top and bottom edge portions D and E respectively. Lacing F extends upwardly from the selvaged portion D to engage the cork line A, as can best be seen in Figure 9, to support the webbing therefrom. Likewise, lacing G extends downwardly from edge portion E and supports a longitudinally extending line H therefrom which extends the entire length of edge E. Line H is hereinafter referred to as the lead line, but it is to be understood that the term "lead line" is synonomous with the terms ground line, bottom line, ring line, and other terms used in commercial fishing to denote a line that extends around the bottom edge of the net.

Lead line H may take a number of forms, and it has been found possible to use either steel cable, manilla rope, or link chain for this purpose. A cable 10 is provided that is affixed to the lead line H at substantially the center thereof, which cable when the net is set extends rearwardly and downwardly therefrom as shown in Figures 3 and 9. The outer extremity of cable 10 is lopped or otherwise attached to an eye 12 that is rigidly affixed to a mushroom-shaped weight 14.

The net above described is preferably transported to the fishing grounds on the stern 16 of a power operated vessel 18 that also carries a skiff 20 or a sea anchor 21 such as shown in Figure 13. When a school of fish is sighted, my net is set with the aid of the skiff 20 which is launched with one end portion 22 of the net being attached thereto. Vessel 18 then circles around the school of fish and returns to a position adjacent the skiff after placing the net in a substantially circular configuration as shown in Figure 1. The use and detailed structure of the sea anchor disclosed in Figure 13 will be described hereinafter. If desired, the sea anchor 21 can be substituted for the skiff 20 to set the net in the manner just described. The end net portion 22 is provided with a line 23 that permits this end portion to be held adjacent skiff 20 which can be extended to vessel 18 when required. The opposite end 25 of the net has a tow line 24 which may be attached to the vessel 18 to secure the end net portion 25 thereto.

With my net so set, it will be apparent that the weight 14 is resting on the bottom of the sea and the cable 10 extends downwardly from the lead line H to the weight. Vessel 18 is preferably provided with a vertically adjustable boom 30 as shown in Figure 3, that has a power operated block 32 depending therefrom, the construction and operation of which has been disclosed and claimed in my two Patents No. 2,733,530 and No. 2,733,531.

When the net is set the vessel 18 is caused to so move relative to the weight 14 (Figure 1) that the two portions of the lead line generally designated H–1 and H–2 are placed under tension and caused to rapidly move inwardly and snap together to close the bottom of the net in substantially parallel relationship as shown in Figure 2, whereby the catch is impounded within the net. Lead line portions H–1 and H–2 tend to remain in the closed position as shown due to the drag imposed by the weight 14 as the lead line is drawn in a direction away from the weight by vessel 18. In retrieving the net from the sea, the cork line A and lead line H are concurrently drawn aboard either manually or by means of the power block 32 and an associated power operated pulley 34, as shown in Figure 5. Depending upon the operating conditions, it sometimes is desirable to retrieve the net by use of the power block alone, with the lead line and cork line passing concurrently thereover. It will be obvious that the lead line portions H–1 and H–2 will at all times remain in a parallel net-closing position when tension is placed on these line portions by the drag of weight 14 as the boat moves in a direction away therefrom. This movement of vessel 18 may be either forward, rearward or sidewise so long as tension is maintained on lead lines H–1 and H–2.

In essence, the power block 32 includes a drum 36 having adjacent and oppositely tapering faces 37 and 37'. The block as a whole is rotatably supported by a frame 38 which depends downwardly from the boom 30 to which it is affixed by a cable 39, or the like. Drum 36 is rotated by an appropriate prime mover 40 that can be mounted either on frame 38 or a suitable structural portion of vessel 18.

The draw net which is the subject of the present invention, will be generally referred to herein per se by the letter K. In retrieving net K from the sea it is preferable that cork lines A (Figures 4 and 5) and the associated webbing C pass over the drum 36 and downwardly therefrom as a moving column 42 onto the deck of vessel 18.

In order to maintain the lead lines H–1 and H–2 in the closed parallel position shown in Figure 2, it may be necessary to draw these lines and webbing C onto vessel 18 at a different rate than used in retrieving the cork lines A. For this reason it may be desirable to have a large grooved pulley, roller, or wheel 34 that is rotatably supported by a suitable frame 46 from the deck of vessel 18. Roller 34 is rotated by a prime mover 48 by means of a belt 50, or other conventional power transmission means. When such a roller 34 is employed, the lead lines H–1 and H–2 are first caused to frictionally engage same to draw the lead lines aboard at the desired rate of speed, and the lead lines and webbing C adjacent thereto are directed upwardly to pass over drum 36 with the cork lines (Figures 4 and 5). By use of the above-described power block 32 and roller 34, net K is drawn inwardly aboardship until a relatively small portion thereof remains in the water, with the fish impounded therein then being brailed into vessel 18 in a conventional manner.

An alternate form K' of my net (Figure 11) has a tapering funnel-like portion 52 leading from an upwardly disposed portion thereof above cable 10', which cable is identical to cable 10 previously mentioned and serves the same function. The free end of funnel portion 52 has the web-defining same removably closed by lacing 54, or other means, from which lacing a flexible line 56 extends to a buoy 58. Buoy 58 at all times indicates the position of funnel 52.

After net K' has been hauled aboard the boat 18 until substantially all but the portion thereof indicated by phantom line in Figure 11 remains in the water, lacing 54 is removed from funnel portion 52 to permit same to be connected to a pipe 60 through which the impounded catch is drawn by a suction pump 63 and thereafter discharged within the hold of vessel 18. It will be apparent that by use of the first alternate form of net K' the manpower and time required in transferring the impounded fish from the net into the boat will be greatly reduced.

Should it be desired, net K can be drawn onto vessel 18 by use of two identical, laterally spaced, elevated power blocks 32 and 32', as shown in Figure 6, with the power roller 34 disposed therebetween. For the sake of clarity in describing this operation, the portions of the cork line A above the lead line portions H–1 and H–2 are identified by the notations A–1 and A–2, respectively. In Figure 6 it will be seen that when the two blocks 32 and 32' are employed, the cork line A–1 and associated webbing C pass through block 32, and cork line A–2 and associated webbing passes through the block 32'. Lead lines H–1 and H–2 frictionally engage power roller 34 to maintain them in a tensioned condition. After leaving the power roller 34 and lines H–1 and H–2 move upwardly to pass through power blocks 32 and 32' with the cork lines A–1 and A–2, respectively.

Although the power wedge-pulley roller 34 permits the lead lines H–1 and H–2 to be retrieved at a different rate of speed than that of the cork lines A–1 and A–2, in some instances this differential in rate is not necessary, and accordingly the power roller 34 may be dispensed with as shown in Figure 7. The net is then retrieved by concurrently directing cork lines A–1 and A–2 and lead lines H–1 and H–2 over block 32.

An alternate method of retrieving net C by means of two power blocks on the same vessel is to criss-cross the wings C–1 and C–2 of net C thereby bringing the lower lines H–1 and H–2 into closing condition much more quickly and positively.

A variation in the mode of retrieving the set net K is shown in Figures 8, 8a and 8b where two power operated vessels 18 and 18' are employed, with these vessels having power blocks 32 and 32', respectively, mounted thereon. The net is set when the boats 18 and 18' dispose it in an oval or circular configuration when the boats move to the adjacent positions shown in Figure 8b. Power block 32 is then actuated to draw cork line A-2 and lead line H-2 with the webbing situated therebetween over this block. Block 32' is concurrently actuated when cork line A-1 and lead line H-1 with the associated webbing is drawn thereover. In Figure 8 the two power blocks 32 and 32' are shown at different heights to avoid unnecessary contact between wings C-1 and C-2 of net C.

In all of the above-described modes of retrieving net K, the frictional resistance offered by weight 14 in dragging along the bottom of the sea maintains the lead lines H-1 and H-2 under tension and in adjacently disposed relationship, and sufficiently tight to prevent escape of any appreciable portion of the catch. The net is then retrieved by concurrently drawing the cork lines A-1 and A-2 and lead lines H-1 and H-2 over block 32.

Should it be desired, a second net 60 can be supported below the lead line H as shown in Figures 9 and 10, which second net will contact the bottom of the sea and contours formed therein to prevent fish within the confines of net K from escaping therefrom prior to the lead lines being placed under tension and in the closed position shown in Figure 12. A particular advantage of net K is that when used with the power block 32, the net can be retrieved either over the stern of the boat as shown in Figures 4 to 7, or over the side of the boat as shown in Figure 12.

The sea anchor 21 (Figure 13) which can be used in lieu of the skiff 20 includes a rigid hoop 62 that has a tapered sack 64 formed of a flexible, lightweight material extending rearwardly therefrom. Several floats 66 are affixed to the upper portion of hoop 62 that are sufficiently buoyant to maintain a portion of the hoop above the water surface. Hoop 62 has several weights 68 mounted on the lower portion thereof that cause the hoop to remain in a generally upright position in the water. A number of ropes or cables 70 are affixed at spaced intervals to hoop 62, which loops extend therefrom and are tied to end portion 22 of net K. A crutch-shaped rigid member 72 extends upwardly from hoop 62 that serves as a support for the line 23 affixed to end portion 22 of the net. A line 76 also extends through sack 64 to the inner extremity thereof to permit the sack to be collapsed to discharge water therefrom should it be necessary to raise the seat anchor to the vessel 18. The seat anchor 21 above described serves the same function as skiff 20 in maintaining one end portion of net K in a stationary position.

Upon occasion it is desired to fish in waters of such depth that the weight 14 affixed to cable 10 will not rest on the bottom of the sea whereby it would not serve to snap the lead lines H-1 and H-2 shut as previously described. In such a situation it is best to substitute a sea anchor therefor, similar to anchor 21, but with floats 66 of sufficient buoyancy attached thereto that the sea anchor will remain submerged at the proper depth. When a sea anchor of this type is employed in fishing in deep waters, the anchor tends to resist any forward movement imparted to lead lines H-1 and H-2 and serves to snap them shut as shown in Figure 2 in the same manner as accomplished by weight 14.

The use and operation of my invention have been described in detail and need not be repeated herein.

Although the invention herein shown and described is fully capable of achieving the objects and providing the advantages as herein set forth, it is to be understood that it is merely illustrative of the presently preferred embodiments thereof and that I do not mean to limit myself to the details as herein described and shown other than as defined in the appended claims.

I claim:

1. A method of fishing from a boat with an elongate net provided with a cork line and a flexible line mounted in a longitudinally extending position on the lower edge portion of said net that comprises: disposing the net in the water in a generally circular configuration with the end portions of said net being adjacently positioned and said net depending downwardly into said water from said cork line; moving the lower edges of said net defining said edge portions toward said boat; initially restraining a point of said lower edge of said net located at substantially the center thereof from moving toward said boat to cause the two edge portions of said net extending from said point toward said boat to move toward one another until adjacently disposed to close the bottom of said net; continuing to move said lower edge portions of said net and said cork line toward said boat to dispose same thereon until but a restricted portion of said net remains in said water from which fish impounded therein can be brailed aboard said boat; and maintaining tension on said lower adjacently disposed edge portions of said net to maintain said net in said closed position as it is moved inwardly aboard said ship.

2. A method of fishing as defined in claim 1 in which said step of initially restraining said lower edge at said point is effected by means affixed to said flexible line that frictionally contacts the bottom of the sea.

3. A method of fishing as defined in claim 1 in which said step of initially restraining said lower edge is effected by movement of means affixed to said flexible line through said water toward said boat.

4. A method of fishing as defined in claim 2 in which said means is a weight that rests on said bottom.

5. A method of fishing as defined in claim 3 in which said means is a submerged sea anchor.

6. A method of fishing from a boat with an elongate net that comprises: disposing said net which has a longitudinally extending upper cork line and a longitudinally extending bottom line in a generally circular configuration in the water with the end portions of said net being adjacently positioned; moving said end portions of said bottom line and said net toward said boat; initially restraining movement of substantially the lower center portion of said net and said bottom line toward said boat to cause said bottom line and said net adjacent thereto to divide into two portions that extend toward said boat, with said portions moving into adjacently disposed positions to close the bottom of said net as said end portions thereof are moved toward said boat; moving said adjacently disposed bottom line portions toward said boat at a faster rate than the upper portion of said net after said lower portion thereof has been closed to dispose said net in a scoop shape; continuing to move said adjacently disposed bottom line portions and the balance of said net toward said boat to dispose same aboard said boat until but a restricted portion of said net remains in said water from which fish impounded therein can be brought aboard said boat; and maintaining tension on said lower adjacently disposed bottom line portions after they have been brought together to maintain said net in a closed bottom position as said net is moved toward and aboard said ship.

7. A method of fishing as defined in claim 6 which includes the step of pumping the fish from said restricted portion.

8. A draw net, the bottom of which is adapted to be closed when said net is disposed in a generally circular configuration, including: an elongate strip of net; a cork line affixed to the upper edge portion of said net, said cork line having sufficient buoyancy to support said net in a depending position therefrom in a body of water; a bottom lne affixed to the lower edge portion of said net; and movement-restraining means affixed at substantially the center point of said bottom line, with said restraining means exerting a sufficient force at said center point as said net is moved through the water away from said means as to cause said bottom line to divide into two portions on opposite sides of said center point, with said bottom line portions moving toward one another until adjacently disposed to close the bottom of said net during initial movement of said net.

9. A draw net as defined in claim 8 wherein said restraining means is a cable depending from said center point and of such length as to reach the bottom of said body of water in which said net is disposed, and a weight is provided that is affixed to the free end of said cable and rests on said bottom, which weight exerts a restraining force on said cable and center point due to frictional contact with said bottom that is sufficient to move said bottom line portions into said net closing positions.

10. A draw net as defined in claim 8 wherein said restraining means is a sea anchor.

References Cited in the file of this patent
UNITED STATES PATENTS

| | | |
|---|---|---|
| 672,571 | Savoy | Apr. 23, 1901 |
| 1,070,232 | Curol | Aug. 12, 1913 |
| 1,133,120 | Fountain | Mar. 23, 1915 |
| 1,980,452 | Tice et al. | Nov. 13, 1934 |
| 2,570,285 | Sundberg | Oct. 9, 1951 |
| 2,677,528 | Dahl | May 4, 1954 |
| 2,733,530 | Puretic | Feb. 7, 1956 |